No. 734,340. PATENTED JULY 21, 1903.
F. J. LAMPTON.
FLY TRAP.
APPLICATION FILED FEB. 18, 1903.
NO MODEL. 2 SHEETS—SHEET 1.
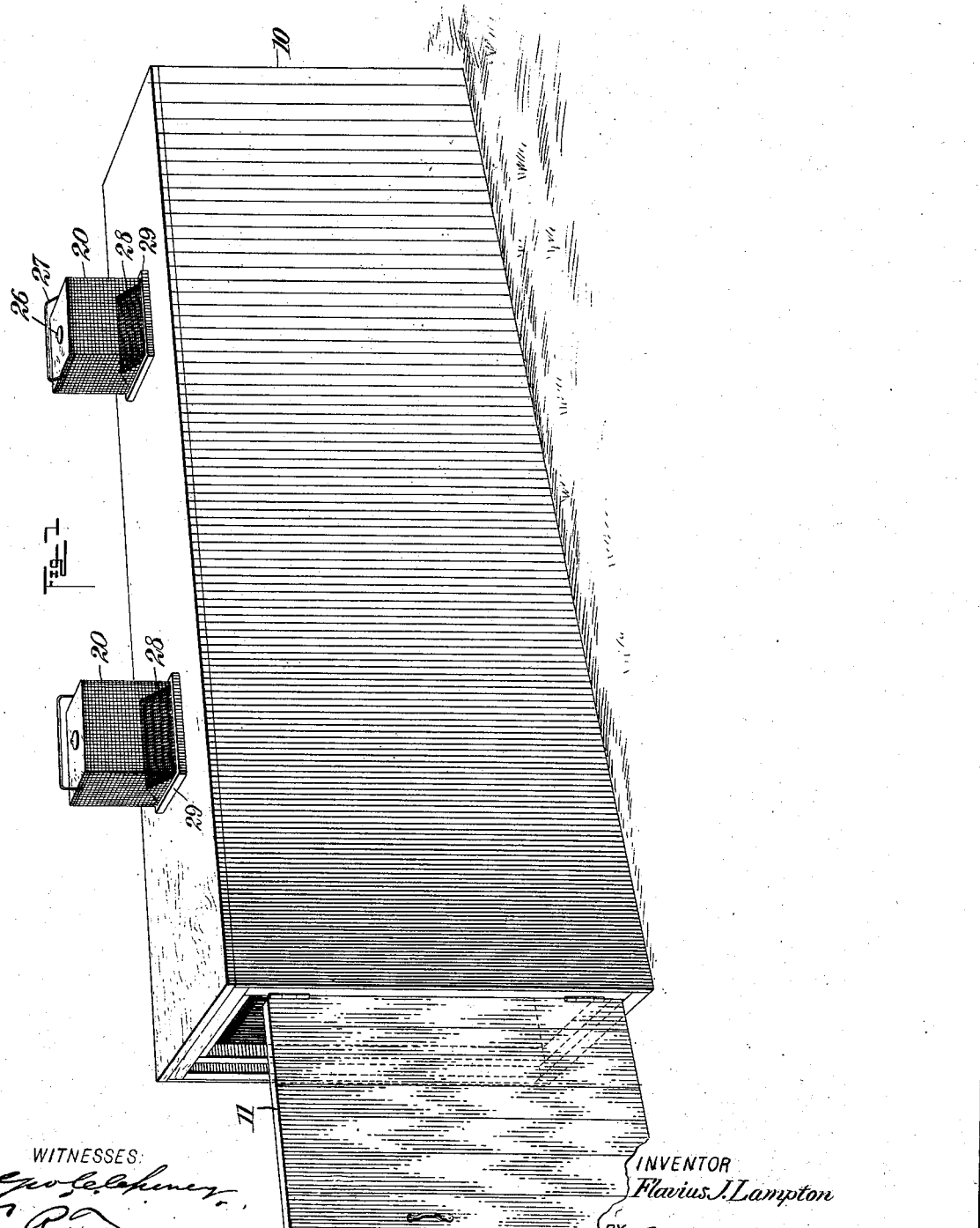
WITNESSES
INVENTOR
Flavius J. Lampton
BY
ATTORNEYS.

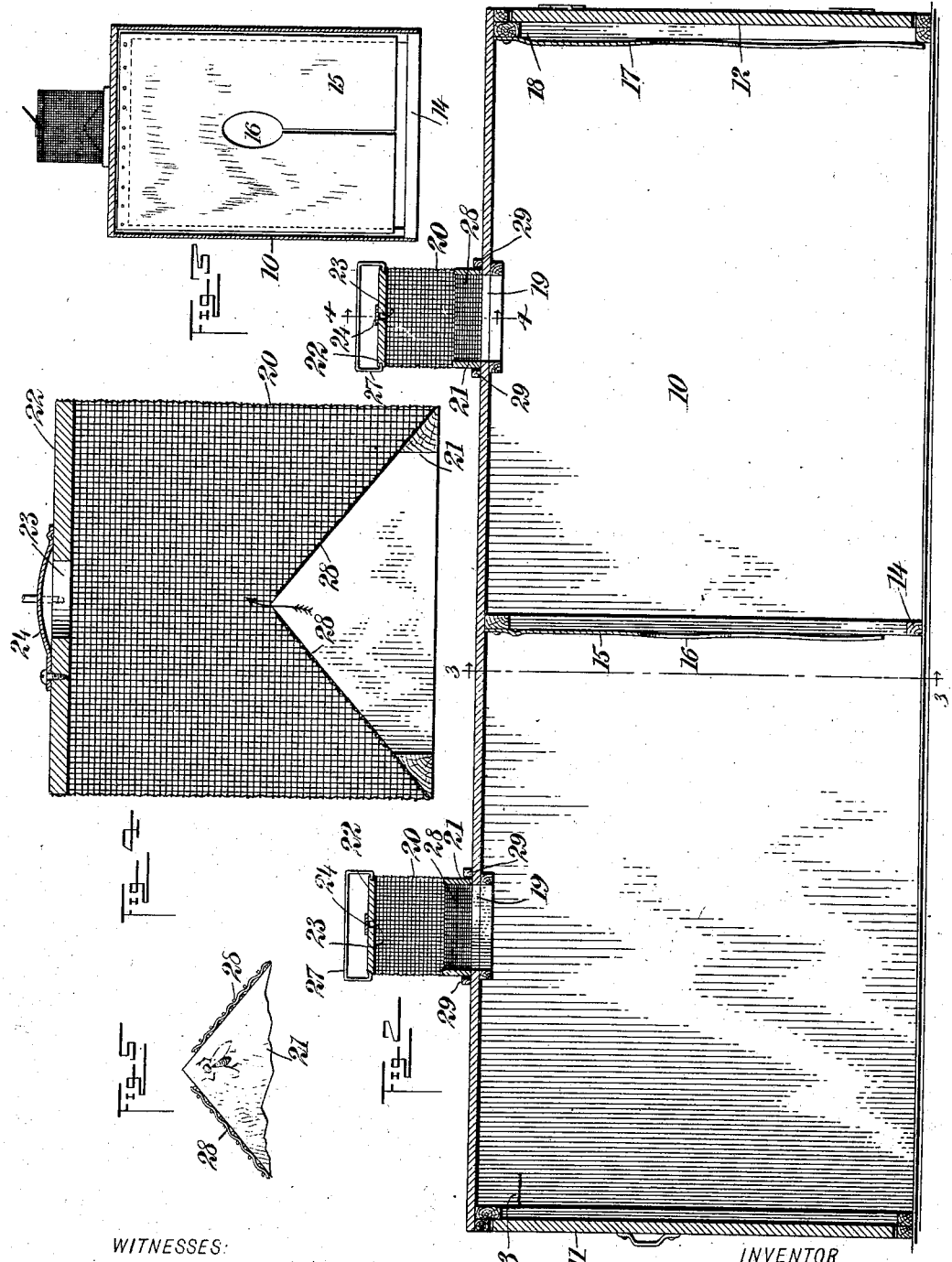

No. 734,340. Patented July 21, 1903.

UNITED STATES PATENT OFFICE.

FLAVIUS J. LAMPTON, OF WEIR CITY, KANSAS.

FLY-TRAP.

SPECIFICATION forming part of Letters Patent No. 734,340, dated July 21, 1903.

Application filed February 18, 1903. Serial No. 143,954. (No model.)

*To all whom it may concern:*

Be it known that I, FLAVIUS J. LAMPTON, a citizen of the United States, and a resident of Weir City, in the county of Cherokee and State of Kansas, have invented a new and Improved Fly-Trap, of which the following is a full, clear, and exact description.

This invention relates to improvements in devices for removing flies or similar winged insects from cows or other animals and trapping the same, an object being to provide a device for this purpose that shall be simple and durable in its construction and comparatively inexpensive.

I will describe a fly-trap embodying my invention and then point out the novel features in the appended claims.

Reference is to be had to the accompanying drawings, forming a part of this specification, in which similar characters of reference indicate corresponding parts in all the figures.

Figure 1 is a perspective view of a fly-trap embodying my invention. Fig. 2 is a sectional elevation thereof. Fig. 3 is a section on the line 3 3 of Fig. 2. Fig. 4 is a section on the line 4 4 of Fig. 2 and on an enlarged scale, and Fig. 5 is a sectional detail showing the lower portion of the trap.

Referring to the drawings, 10 designates the structure, of any suitable material—that is, the sides may consist of sheet metal or of wood and the top of wood. This structure is sufficiently large to permit an animal, such as a cow or a horse, to pass through. At one end, which may be termed the "entrance" end, the structure is provided with a swinging door 11, and at the outward end is a swinging door 12. Arranged on the frame at the upper portion of the door-opening at the entrance end is a screen 13, which extends downward for a short distance and then inward, this screen being designed to prevent flies from passing out through the doorway of the entrance when the door 11 is open, as it is well known that flies will go to the upper portion of a structure in seeking to escape.

At the center of the structure is a frame 14, in which is hung a curtain 15 of any suitable material—such, for instance, as heavy cloth. This curtain at about its center is provided with an opening 16, through which the animal may see and pass its head. The curtain from this opening down is slitted or separated into two parts, so that when an animal passes through the same the two members of the curtain will engage the sides of the animal, scaring off the flies or rubbing them off the animal. A similar curtain 17 is hung on a frame 18, arranged just inside the door 12. The curtain 15 practically divides the structure into two compartments, and communicating with each compartment is a trap for receiving the flies or other insects. The top board of the structure over each compartment is provided with an opening 19, and over this opening the trap is placed. The side walls of the trap consist of a netting 20, the lower portion of this netting being attached to a frame 21 and the top wall 22 consisting of wood. This top is provided with an opening 23, over which is a movable cover 24, and connected to the top is a bail 27. The end walls of the frame 21 are made triangular and extend upward into the body 20 of the trap, and connected to these end walls and the sides of the frame 21 is a wire-netting 28, which is slightly spaced apart at the apex to permit flies to pass through same. The trap is removably seated between strips 29, attached to the top of the structure.

Before operating the device for the purpose designed the cattle should become accustomed to passing through it—that is, the doors at both ends should be opened and the cattle one at a time driven through. When the end doors are closed, the structure interior will be quite dark, and therefore the flies or other insects upon leaving the animals pass through, seeking escape by way of the traps. As soon as an animal enters the structure the door at the entrance end is to be immediately closed and the door at the outlet end opened. The animals in passing through the curtains will agitate the same, so that the flies will be frightened or rubbed off. After the animal passes out the outlet-door is to be closed for a few moments, rendering the structure dark, as before mentioned, when the flies or other insects will pass into the traps. The traps, with the flies in them, are now to be removed and the flies killed by burning or other suitable means, and then the dead flies may be emptied out through the opening 23.

Having thus described my invention, I claim as new and desire to secure by Letters Patent—

1. A device for the purpose described, comprising a structure having an inlet at one end, and an outlet at the other end, a screen extended downward and inward at the top of the outlet, a curtain at the inlet end, a curtain between the ends of the structure, both of said curtains consisting of cloth divided centrally, and a trap having communication with the interior of the structure.

2. A device for the purpose specified, comprising a structure through which animals may pass, a door at each end of the structure, a screen extended downward and inward at the top of the outlet-doorway, curtains suspended in the structure, each curtain having an opening at about its center and divided below said opening, and traps communicating with the interior of the structure.

In testimony whereof I have signed my name to this specification in the presence of two subscribing witnesses.

FLAVIUS J. LAMPTON.

Witnesses:
JAMES WEST,
J. H. DOWNEY.